(12) United States Patent
Assadi et al.

(10) Patent No.: US 9,291,703 B2
(45) Date of Patent: Mar. 22, 2016

(54) METHOD AND A DEVICE FOR IDENTIFYING THE POSITION OF A TRANSPONDER

(75) Inventors: Houssem Assadi, Caen (FR); Philippe Levionnais, Caen (FR)

(73) Assignee: Orange, Paris (FR)

( * ) Notice: Subject to any disclaimer, the term of this patent is extended or adjusted under 35 U.S.C. 154(b) by 44 days.

(21) Appl. No.: 14/008,825

(22) PCT Filed: Mar. 28, 2012

(86) PCT No.: PCT/FR2012/050652
§ 371 (c)(1),
(2), (4) Date: Sep. 30, 2013

(87) PCT Pub. No.: WO2012/131254
PCT Pub. Date: Apr. 10, 2012

(65) Prior Publication Data
US 2014/0024391 A1 Jan. 23, 2014

(30) Foreign Application Priority Data
Mar. 30, 2011 (FR) ...................................... 11 52618

(51) Int. Cl.
*G01S 5/10* (2006.01)
*G06K 7/00* (2006.01)
*G06K 7/10* (2006.01)

(52) U.S. Cl.
CPC .................. *G01S 5/10* (2013.01); *G06K 7/0008* (2013.01); *G06K 7/10079* (2013.01); *G06K 7/10128* (2013.01); *G06K 7/10237* (2013.01)

(58) Field of Classification Search
CPC .... G01S 5/10; G06K 7/0008; G06K 7/10079; G06K 7/10128; G06K 7/10237
USPC .................... 455/41.1, 456.1; 340/10.1–10.4
See application file for complete search history.

(56) References Cited

U.S. PATENT DOCUMENTS 6,281,794 B1 * 8/2001 Duan et al. ................. 340/572.1
6,650,226 B1 * 11/2003 Wuidart et al. .............. 340/10.1
(Continued)

FOREIGN PATENT DOCUMENTS

| EP | 1043679 B1 | 9/2007 |
| WO | 9734250 A1 | 9/1997 |
| WO | 2007036967 A1 | 4/2007 |

OTHER PUBLICATIONS

International Search Report and Written Opinion of the International Searching Authority dated May 29, 2012 for corresponding Interntional Application No. PCT/FR2012/050652, filed Mar. 28, 2012.

(Continued)

*Primary Examiner* — Nathan Taylor
(74) *Attorney, Agent, or Firm* — David D. Brush; Westman Champlin & Koehler, P.A.

(57) ABSTRACT

A terminal is provided, which has a near-field communication module suitable for receiving signals from a transponder fitted with a circuit presenting a load impedance. The terminal includes a receiver suitable for receiving a first signal relating to the load impedance of the transponder (T3). The terminal obtains a second signal from the first signal and determines a position indication of the terminal relative to the transponder and based on analysis of the second signal. The terminal delivers a third signal that is a function of the determined position indication.

5 Claims, 3 Drawing Sheets

(56) References Cited

U.S. PATENT DOCUMENTS

| | | | |
|---|---|---|---|
| 6,703,921 B1* | 3/2004 | Wuidart et al. | 340/10.4 |
| 8,948,713 B2* | 2/2015 | Kratochwil et al. | 455/115.1 |
| 2006/0238301 A1* | 10/2006 | Wu et al. | 340/10.1 |
| 2008/0090519 A1* | 4/2008 | Rofougaran et al. | 455/41.1 |
| 2009/0160603 A1* | 6/2009 | Bauchot et al. | 340/3.51 |
| 2010/0317297 A1* | 12/2010 | Kratochwil et al. | 455/67.11 |
| 2010/0328045 A1* | 12/2010 | Goto et al. | 340/10.4 |

OTHER PUBLICATIONS

French Search Report and Written Opinion dated Nov. 17, 2011 for corresponding French Patent Application No. 1152618, filed Mar. 30, 2011.

International Preliminary Report on Patentability and English translation of the Written Opinion dated Oct. 2, 2013 for corresponding International Application No. PCT/FR2012/050652, filed Mar. 28, 2012.

* cited by examiner

METHOD AND A DEVICE FOR IDENTIFYING THE POSITION OF A TRANSPONDER

CROSS-REFERENCE TO RELATED APPLICATIONS

This application is a Section 371 National Stage Application of International Application No. PCT/FR2012/050652, filed Mar. 28, 2012, which is incorporated by reference in its entirety and published as WO 2012/131254 on Oct. 4, 2012, not in English.

TECHNICAL FIELD

The invention relates in general to telecommunications and more precisely to contactless communications making use of short-range radio technologies, and in particular of the radio frequency identification (RFID) type. The invention applies more particularly to terminals that have hardware and software resources including a microprocessor and a near-field (NF) communication module for generating an electromagnetic field and suitable for communicating with electromagnetic transponders that may be passive, active, or semi-active.

The terminals in question, referred to below as "mobile terminals" are terminals suitable for being moved about.

STATE OF THE PRIOR ART

Near-field communication (NFC) is based mainly on the International Standards Organization standard ISO 14443 and they use wireless technologies to enable information to be exchanged between two peripherals that are spaced apart by a short distance, typically less than 10 centimeters. Communications of this type provide numerous applications in the fields of payment or transport, for example.

Near-field communications cover two types of application:
a first type serves to emulate a near-field communication module in a mobile terminal in order to secure electronic transactions between an application stored in the terminal or the module and an external reader that emits electromagnetic waves in order to read the data in the module; and
the second type of application, to which the invention applies, relates to the mobile terminal reading data on transponders; this is referred to as "tag reading" by the NFC Forum (an industrial association for promoting the implementation and the standardization of NFC technology). An NFC communication is established between a master, referred to herein as the "terminal", and a slave, referred to herein as the "transponder". For example, the terminal may be a mobile telephone and the terminal may be a tag associated with a service. Such services give access to all kinds of information: there are applications concerning transport, payment, access to the Internet, sending short-message service (SMS) messages, or making telephone calls, etc. Establishing communication enables a user of the terminal to read information contained in a tag by bringing the mobile terminal close to the medium or support (display panel, catalog, etc.) on which the tag is arranged.

The transponder to which the invention applies has a microprocessor and it may be of the passive type (not requiring its own power supply), of the semi-active type (if a portion of its circuit is powered), or of the active type (if the entire circuit powered).

Below, it is assumed that the transponder is of the passive type. In this context, the transponder does not have its own power supply and is powered by coupling passing via the electromagnetic field of the terminal in which the transponder is immersed. Good communication between the two devices requires the distance between them to be short and their NFC antennas to be properly oriented.

These two conditions can be difficult to satisfy when the user cannot clearly distinguish the transponder that is to be addressed. In particular, in a multi-transponder environment, e.g. on a display panel in a public place, a plurality of transponders corresponding to different applications may be very close to one another. It is then difficult to identify exactly one particular transponder amongst several, if this is not clearly visible in its display.

For this purpose, proposals have been made to associate specific signaling with the transponder in order to inform the user of the terminal about the exact location of the transponder. For example, a known technique seeking to offer NFC services in a town proposes signaling that is simple and easily recognizable, thereby enabling the user of such a service to identify the transponder easily and thus move the mobile terminal close to the terminal. However such signaling remains difficult to identify if the transponder is surrounded by other transponders for which the signaling is similar or if the signaling leads to mutual inference because of the proximity of the transponders.

Further difficulties arise if the user is visually handicapped.

The invention provides a solution that avoids the drawbacks of the prior art.

SUMMARY

To this end, in a functional aspect, the invention provides a method of identifying the position of a terminal relative to a transponder fitted with a circuit presenting a load impedance, said terminal being suitable for receiving signals from the transponder, the method being characterized in that it comprises:
a step of the terminal receiving a first signal relating to the load impedance of the transponder;
a step of obtaining a second signal from the first signal;
a step of determining a position indication about the position of the terminal relative to the transponder and based on analyzing the second signal; and
a step of delivering a third signal as a function of the position indication as determined.

Thus, the invention provides the advantage of giving the user of the mobile terminal an indication about the position of the terminal relative to the target transponder, thereby enabling the user to come as close as possible to the transponder.

In a particular implementation of the method of the invention, the above-described method also includes a step of digitizing the first signal in order to obtain the second signal. This implementation of the invention makes it simple to obtain a digital signal that is a function of the load impedance, and that is usable by the microprocessor of the terminal, unlike the first signal that already exists in the terminal but that is not used in a conventional context of communication between a terminal and a transponder in the prior art.

In a variant of this first implementation, used as an alternative or together with the above implementation, the determined position indication is a distance variation that is calculated using the following steps:
a first step of measuring a position indication of the terminal at a first instant;

a second step of measuring a position indication of the terminal at a second instant; and a step of evaluating a distance variation from the first measurement and the second measurement.

This variant implementation of the invention makes it possible for the use of the mobile terminal to know whether the terminal is moving towards or away from the target depending on the sign of the distance variation as calculated between the two instants.

In a hardware aspect, the invention also provides a communication terminal fitted with a near-field device suitable for receiving signals from a transponder fitted with a circuit presenting load impedance, the terminal being characterized in that it comprises:

receiver means enabling the terminal to receive a first signal relating to the load impedance of the transponder;

obtaining means for obtaining a second signal from the first signal;

determination means for determining a position indication of the terminal relative to the transponder, based on analyzing the second signal; and delivery means for delivering a third signal that is a function of the determined position indication.

In a first particular embodiment of the terminal of the invention, the above-described terminal also includes digitizing means for digitizing the first signal in order to obtain the second signal.

In a variant of this embodiment, the terminal also includes means for evaluating a distance variation between two position indications measured at two distinct instants.

In another hardware aspect, the invention also provides a computer program suitable for being implemented on a terminal as described above, the program comprising code instructions that, when the program is executed by a processor, perform the steps of the above-defined method.

The invention can be better understood on reading the following description given by way of example and made with reference to the accompanying drawings.

THE FIGURES

DETAILED DESCRIPTION OF AN EMBODIMENT ILLUSTRATING THE INVENTION

The present invention is described with reference to FIGS. 1 to 5. Only the steps necessary for understanding the invention are described in detail.

Figure 1:
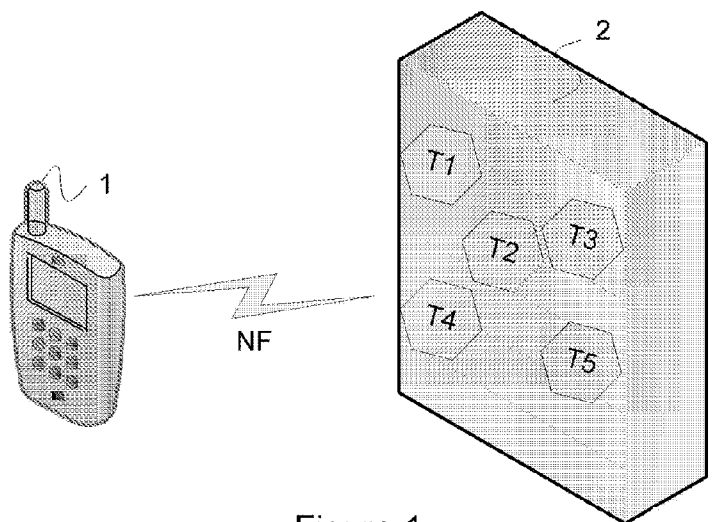
FIG. 1 is a diagram of a terminal and a plurality of transponders in the prior art.

FIG. 1 shows a system comprising a terminal 1 and a plurality of transponders T1-T5 arranged on a display panel 2 or on any other type of support or medium.

The terminal 1 is suitable for near-field communication with each of the transponders T1-T5, using an electromagnetic field NF.

The terminal 1 shown herein a mobile telephone possessing an NFC module, but it could have other forms, for example it could be an IC card reader, a personal computer, or any other portable device suitable for near-field communication with transponders.

Likewise, the transponders shown here are NFC tags, but in the context of the invention they too could be in the form of contactless IC cards, or mobile terminals behaving as such.

The mobile terminal that in this example behaves like a contactless card reader, is suitable for entering into communication with the transponders when the user of the mobile terminal comes close to the support 2 on which they are arranged. For example, the support might be the wall of a bus shelter and the tags may be intended respectively to give a user of the terminal information about a town (T1) or a transport network (T2), to top up a user's ticket account with tickets (T3), to calculate an itinerary (T4), or to purchase goods from a trader or a ticket for a show (T5).

It is assumed that the user of the mobile terminal seeking to top up a ticket account pays attention to the tag T3. Once the user has identified the support 2 and after coming up to the transponders, that has the effect of immersing all of them in the NF electromagnetic field of the mobile terminal, as is described in greater detail below with reference to FIG. 2. In response, when the transponders are powered, the terminal receives signals relating to the load impedances of the transponders, as is also described below.

In the state of the art it is well known how to manage collisions between a plurality of these transponders that transmit information simultaneously to the terminal, which might then be unable to distinguish between them. For example, European patent EP 0 472 472 describes one such method.

This step is therefore not described herein, since the problem that is to be solved is the problem of finding the tag T3, i.e. of coming as close as possible thereto, and not how to manage problems of collisions with the other transponders, which problem is assumed to be solved.

The user of the mobile terminal, who may be visually impaired, cannot accurately distinguish the tag T3 from among the other tags. The object of the invention is to guide the user to the tag T3 so as to establish good communication between the mobile terminal and the tag T3.

Figure 2:
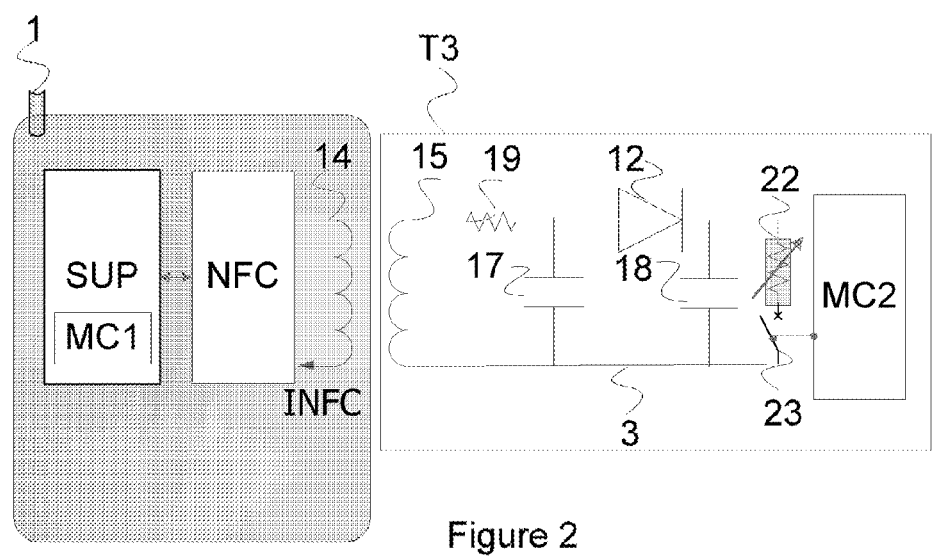
FIG. 2 is a block diagram showing the FIG. 1 terminal coupled with a transponder.

FIG. 2 shows communication between a terminal 1 and a transponder T3 in the prior art. Each of the devices has an antenna (14, 15). By analogy, the assembly constituted by the terminal and the transponder may be thought of as a transformer in which the terminal acts as the primary circuit (14, NFC), and the circuit 3 of the transponder T3 acts as the secondary circuit.

In outline, the terminal has control electronics for near-field communication, referred to as a module NFC, and also a supervisor module SUP, including a microprocessor MC1 that manages exchanges with the tag T3.

An electric current in the primary circuit of the terminal 1 generates an electromagnetic field via the antenna. By electromagnetic induction, an electric current is generated in the circuit 3 of the secondary as soon as it is immersed in the near field. This secondary current is rectified by a diode 12 and can then power a microprocessor MC2 of the transponder. The antenna 15, its intrinsic resistance 19, and capacitors 17 and 18 form an oscillating RLC circuit that is tuned to the frequency of oscillation of the primary.

The terminal thus communicates with the transponder merely by amplitude modulation at its terminals.

In order to communicate with the terminal, in this example, the transponder T3 varies its own electrical power consumption, thereby inducing variation in the electric current in the primary, via the antenna of the terminal 14. The circuit 3 of the secondary thus represents a load of variable impedance, as seen from the primary. It is as though this load, represented in the figure by a variable impedance 22, were being connected by the microprocessor MC2 of the transponder T3 in parallel with the circuit 3 of the secondary.

If the microprocessor MC2 of the transponder T3 causes this load impedance 22 to vary by means of a switch 23, then the power consumption of the secondary changes, thereby giving rise to a variation in the induced current INFC that can be measured at the primary. This is known as load modulation. By this method, the transponder can establish communication with the terminal: a variation of the current in the transponder generates a variation of the current in the primary; in particular, an intensity peak in the primary may be considered as receiving a binary symbol.

Present devices that make use of this load modulation technique pay attention to significant variations in the load caused by the transponder, or transferred load, i.e. variations that exceed a certain threshold, but does not pay attention to the load modulation rate. For example, a 0 binary symbol is detected if the current induced at the terminal by the load variation is greater than a current $INFC_0$ (e.g. $INFC_0=10$ milliamps (mA)) and a 1 binary symbol is detected if the induced current is greater than a current $INFC_1$ (e.g. $INFC_1=10\times INFC_0=100$ mA). However small variations in the induced current INFC about those two thresholds are not used.

Figure 3:
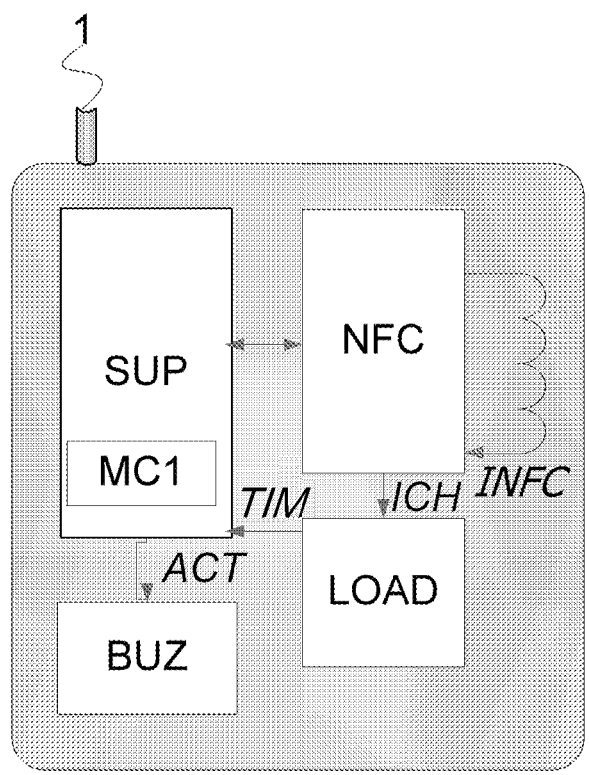
FIG. 3 is a block diagram showing the general architecture of the terminal of the invention.

FIG. 3 shows a terminal of the invention. In addition to the modules NFC and SUP of FIG. 2, this terminal includes means for measuring the transferred load impedance represented by a circuit LOAD and connected, electrically in this example, to the module NFC and to the supervisor module SUP. The module NFC delivers a current ICH to the circuit LOAD as a function of the transferred load impedance. This load current ICH may for example be equal to the load current transferred into the primary, INFC. It may also be directly proportional to the value of the transferred load impedance. The circuit LOAD outputs a transferred impedance measurement signal TIM.

The terminal of the invention in this example also has a circuit BUZ for controlling a buzzer at a variable sound frequency that can be actuated via a signal ACT delivered by the microprocessor MC1 of the module SUP. The supervisor SUP delivers constant amplitude voltage pulses to the buffer at a period that varies depending on the sound frequency that is to be generated. In other embodiments, the buzzer may be replaced by any other device suitable for issuing an indication to the user of the mobile terminal, e.g. a vibrator, a light signal, etc.

The terminal of the invention operates on the following principle: if the distance between the terminal 1 and the transponder T3 decreases (or conversely increases), then the load impedance transferred into the terminal increases (or conversely decreases). A measurement by the circuit LOAD of the load current ICH (which is a function of the current INFC) transferred into the terminal thus makes it possible to evaluate variations in the relative distance between the two devices. The information TIM that is a function of the input current ICH into the circuit LOAD is transmitted to supervisor SUP which is suitable for determining a distance variation and for issuing an order ACT to actuate the module BUZ. For example, if the transferred load impedance increases, meaning that the transponder is getting closer, then the supervisor SUP shortens the period of the voltage pulses at the terminals of the buzzer in order to increase its buzzing rate. On the contrary, if the transferred impedance decreases, then the supervisor SUP increases the period in order to reduce the buzzing rate.

Figure 4:
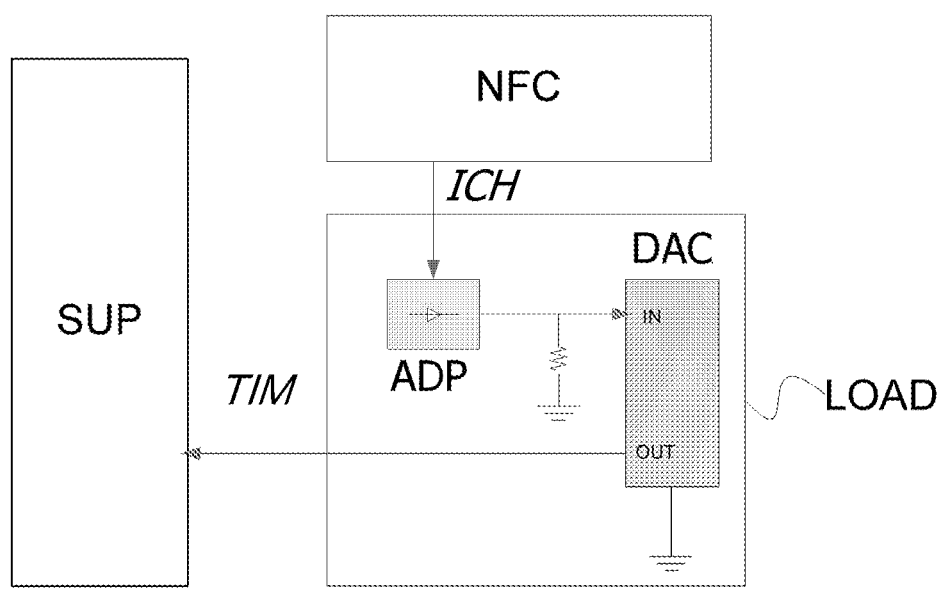
FIG. 4 shows in greater detail the circuit of FIG. 3 for evaluating load modulation.

The circuit LOAD dedicated to measuring the transferred load impedance during coupling is shown in greater detail in FIG. 4. The circuit LOAD is connected to the control electronics of the module NFC, from which it receives a load current ICH of magnitude that is a function of the current INFC and thus of the transferred load impedance. The circuit LOAD is also connected to the module SUP to which it supplies information TIM about the transferred load impedance. the current ICH from the module NFC passes through an adapter ADP in order to be transformed into a voltage that is applied to the input pin IN of a digital-to-analog converter circuit DAC of the module LOAD. This voltage, which is thus a function of the transferred load impedance, is digitized by the digital-to-analog converter DAC, which transposes it into a transferred impedance measurement TIM. If the voltage on the pin IN of the DAC increases, that means that the terminal has come closer to the transponder and TIM increases; if the voltage decreases, that means it has moved away and TIM decreases. This information about coming closer or going further away is transmitted to the supervisor SUP that can trigger an appropriate action as described above, e.g. increasing or decreasing the sound rate of the buzzer BUZ of FIG. 3.

Naturally, this circuit LOAD is given solely by way of example. It could be replaced by any other circuit suitable for delivering information to the supervisor SUP about the transferred load impedance.

Figure 5:
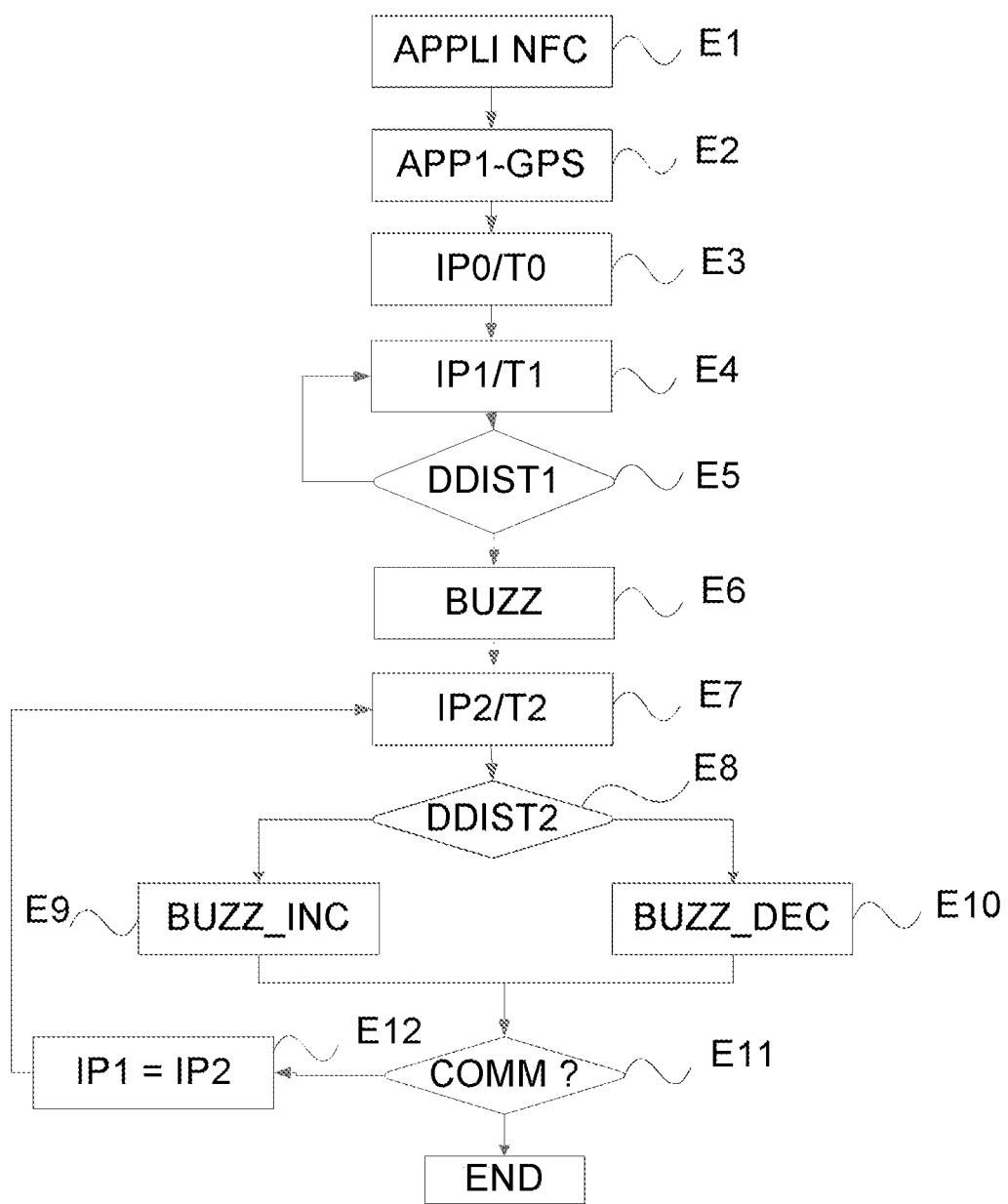
FIG. 5 is a flow chart showing the different steps of the method in the terminal of the invention.

FIG. 5 shows the various steps of the invention as performed on the terminal of FIG. 3.

During a step E1, the user of the mobile terminal provides the terminal with a description of the desired NFC service. For example, the user may select the service from a list, or in another example the user may use a keyboard of the terminal to input and identifier of the service. This service may be topping up a ticket account and the identifier may then be the name or a reference of the transport service.

During a step E2, a high-level guidance application, typically of the global positioning system (GPS) type, informs the terminal of the position of its target, so that the user can move towards the nearest NFC tab that corresponds to the desired category of NFC application (topping up tickets). The GPS system has transmitter satellites that enable the GPS receiver of the terminal to calculate its position by determining its distance from a plurality of those satellites. It is well known to use such a system for informing the terminal of a route to be followed towards a target (service station, shop, bus shelter, etc.). This first guided-approach step is therefore not described in greater detail. The GPS systems presents accuracy that is limited. At the end of this step E2, the user is thus in the vicinity of the tag (typically within one meter). The purpose of the following steps is to guide the user more finely towards the tag.

Below in this embodiment, the user of the mobile terminal attempts to come closer to the target, i.e. to the support on which the transponders are arranged.

During a step E3, a first position indication IP0 is calculated by the circuit LOAD and the supervisor SUP of FIG. 3. The measurement of the load impedance as transferred into the terminal makes it possible to establish a first position indication IP0 as a function of the signal TIM0 output by the circuit LOAD at this instant T0. If the transponders are still very far from the mobile terminal, then the transferred load impedance is zero and thus the induced current INFC0 is zero, the signal TIM0 is zero, and the position indication IP0 as calculated by the supervisor may be zero.

A position indication IP1 is calculated from a signal TIM1 at an instant T1 during a step E4 similar to the step E3. If the terminal has moved, this position indication IP1 may be different from the position indication IP0. In particular, if the user of the mobile terminal has come closer to the target, then the terminal starts powering the target tag and possibly also one or two other tags, e.g. located on the tag support 2 of FIG. 1, by immersing them all in its electromagnetic field NF. The transferred load impedance is no longer zero and the position indication IP1 becomes positive.

A first difference DDIST1=(IP1−IP0) is calculated in the following step E5 by the supervisor SUP. If this evaluation of a distance difference DDIST1 is positive, i.e. if the terminal has come closer to the tag, then the buzzer BUZ is activated by the supervisor SUP in a step E6. Typically, during this step, the buzzer is activated to provide a slow sound rate. In contrast, if the difference DDIST1 is zero, that means that the transferred load impedance has not changed, and step E4 is performed again in order to measure a new position indication IP1.

During a step E7, the circuit LOAD and the supervisor SUP of FIG. 3 perform a third evaluation of the position indication IP2. The measured transferred load impedance serves to establish this indication IP2 as a function of the signal TIM2 output by the circuit LOAD at this instant T2.

During a step E8 similar to the step E5, a second difference DDIST2=(IP2−IP1) is calculated. If this difference DDIST2 is positive, i.e. if the terminal has come closer to the tag, then the sound rate of the buzzer BUZ is increased by the supervisor SUP during a step E9, and otherwise it is decreased during a step E10.

The step E11 makes it possible to validate the establishment of communication between the terminal and the transponder. During the step E11, the terminal applies the protocol that is normally used for NFC communication, which is well known and therefore not described here. Once the terminal has managed to enter into communication with the transponder T3, which was specified in step E1 in this example, the test of step E11 becomes positive and the guidance process comes to an end (END). In contrast, if the test in step E11 is negative, the position indication IP2 becomes the new reference distance (IPI=IP2) during a step E12, and a new position indication IP2 is calculated by returning to step E7.

Thus, the steps E7 to E12 are repeated until the user of the mobile terminal, as guided by variations in the sound rate of the buzzer, has brought the terminal close enough to the target transponder T3 to establish good communication therewith, thereby leading to a successful outcome from the test of step E11 and to the end of the method (END).

Naturally, the sound rate of the buzzer is merely a parameter given by way of example. The fine-guidance method performed in steps E6 to E12 may be based on increasing the volume of the sound signal from the buzzer. Alternatively, the buzzer may be replaced by a steady or flashing light signal, a vibrator, a voice, or any other means suitable for informing the user of the terminal about whether the user is coming closer to or going further away from the target.

The invention claimed is:

1. A method comprising:
 identifying a position of a terminal relative to a transponder fitted with a circuit presenting a load impedance, said terminal receiving signals from the transponder through a single antenna and circuit, wherein identifying comprises:
 a step of the terminal receiving through the single antenna and circuit a first signal relating to the load impedance of the transponder;
 a step of obtaining a second signal from the first signal;
 a step of determining a position indication about the position of the single antenna and circuit of the terminal relative to the transponder and based on calculating a distance variation from the second signal, including:
 measuring a position indication of the terminal at a first instant;
 measuring a position indication of the terminal at a second instant; and
 evaluating a distance variation from the first measurement and the second measurement; and
 a step of delivering a third signal as a function of the distance variation as determined, suitable for informing a user of the terminal about a variation of said position indication relative to an earlier position indication.

2. A method according to claim 1, wherein the step of obtaining the second signal includes a step of digitizing the first signal in order to obtain the second signal.

3. A terminal comprising:
 a near-field communication device configured for receiving signals from a transponder fitted with a circuit presenting load impedance;
 a receiver configured to enable the terminal to receive a first signal relating to the load impedance of the transponder through a single antenna and circuit;
 obtaining means for obtaining a second signal from the first signal;
 determination means for determining a position indication of the single antenna and circuit of the terminal relative to the transponder, based on calculating a distance variation from the second signal, including:
 measuring a position indication of the terminal at a first instant;
 measuring a position indication of the terminal at a second instant; and
 evaluating a distance variation from the first measurement and the second measurement; and
 delivery means for delivering a third signal that is a function of the determined distance variation, suitable for informing a user of the terminal about a variation of said position indication relative to an earlier position indication.

4. A terminal according to claim 3, wherein the terminal includes digitizing means for digitizing the first signal in order to obtain the second signal.

5. A non-transitory computer-readable medium comprising a computer program stored thereon and suitable for being implemented on a terminal, the program comprising code instructions that, when the program is executed by a processor, performs steps of a method of identifying a position of the terminal relative to a transponder fitted with a circuit presenting a load impedance, said terminal being receiving signals from the transponder through a single antenna and circuit, the method comprising:
 a step of the terminal receiving through the single antenna and circuit a first signal relating to the load impedance of the transponder;
 a step of obtaining a second signal from the first signal;
 a step of determining a position indication about the position of the single antenna and circuit of the terminal relative to the transponder and based on calculating a distance variation from the second signal, including:
 measuring a position indication of the terminal at a first instant;
 measuring a position indication of the terminal at a second instant; and
 evaluating a distance variation from the first measurement and the second measurement; and a step of delivering a third signal as a function of the distance variation as determined, suitable for informing a user of the terminal about a variation of said position indication relative to an earlier position indication.

\* \* \* \* \*